C. H. TRUE & N. T. McKEE.
DIE FOR MAKING PIPE BENDS.
APPLICATION FILED JAN. 26, 1915.
1,155,109.
Patented Sept. 28, 1915.
2 SHEETS—SHEET 1.
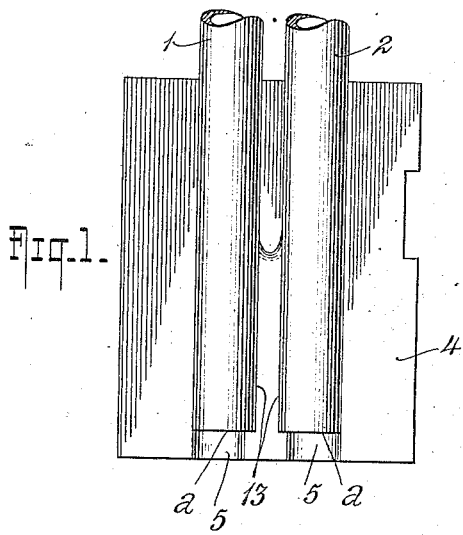
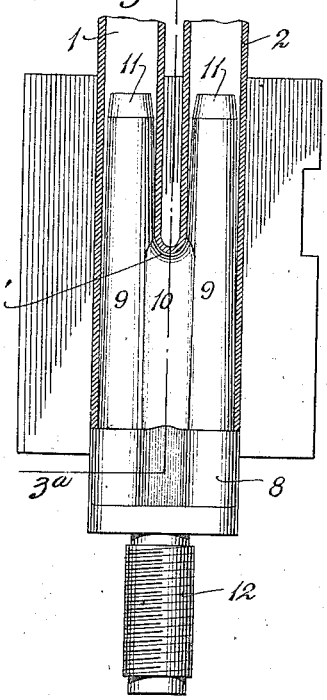
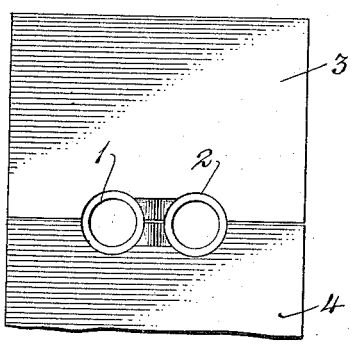
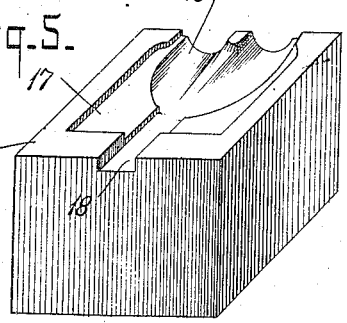
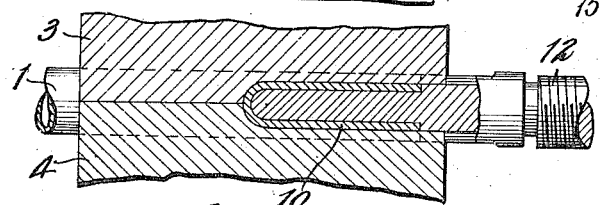
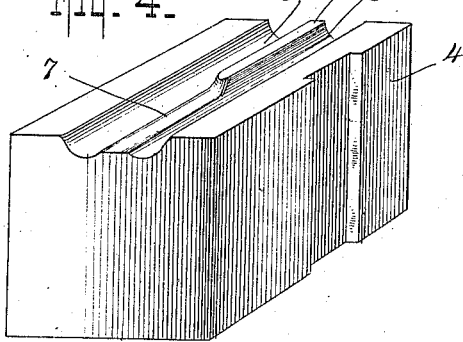
WITNESSES
INVENTORS
CHARLES H. TRUE
NEAL T. McKEE
BY
ATTORNEYS C. H. TRUE & N. T. McKEE.
DIE FOR MAKING PIPE BENDS.
APPLICATION FILED JAN. 26, 1915.
1,155,109.
Patented Sept. 28, 1915.
2 SHEETS—SHEET 2.
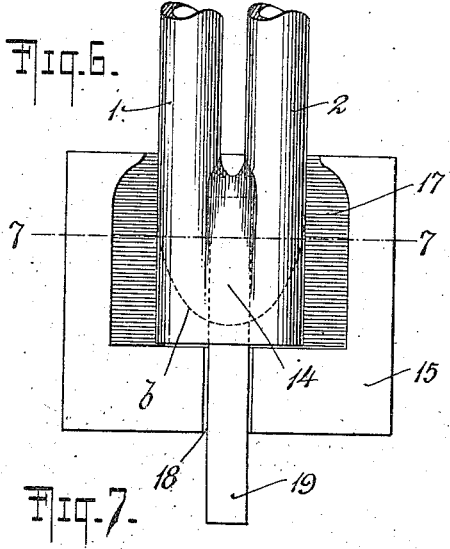
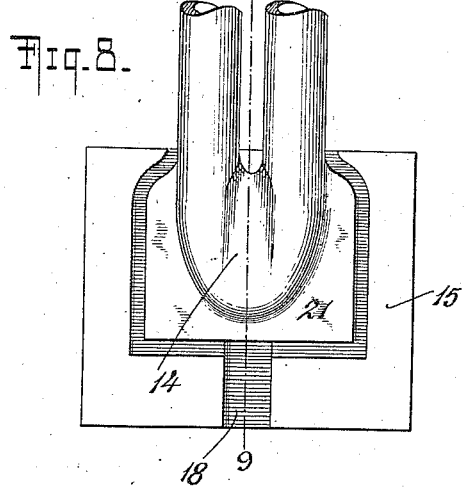
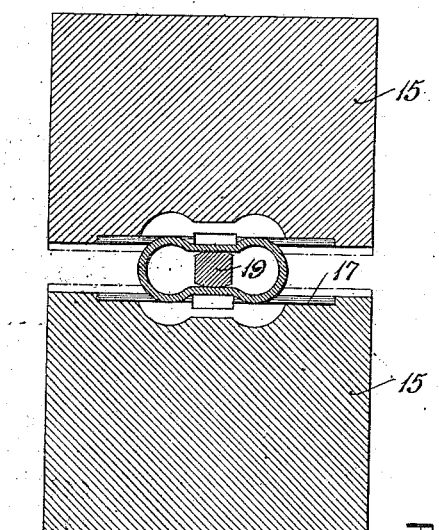
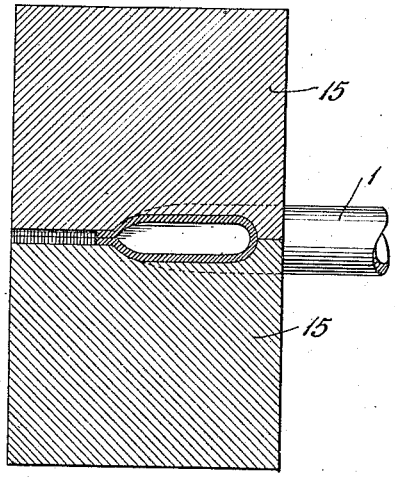
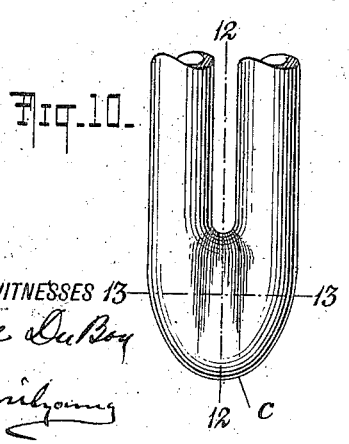
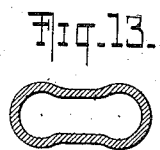
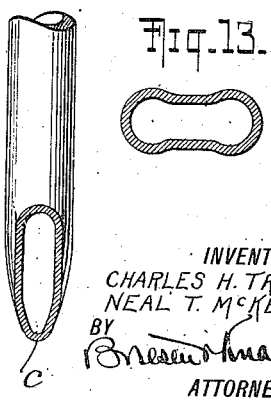
WITNESSES
George DuBoy
Elmer Smilyoung
INVENTORS
CHARLES H. TRUE
NEAL T. McKEE
BY
ATTORNEYS

UNITED STATES PATENT OFFICE.

CHARLES H. TRUE, OF HAMMOND, INDIANA, AND NEAL TRIMBLE McKEE, OF DOBBS FERRY, NEW YORK, ASSIGNORS TO LOCOMOTIVE SUPERHEATER COMPANY, OF NEW YORK, N. Y., A CORPORATION OF DELAWARE.

DIE FOR MAKING PIPE-BENDS.

1,155,109.    Specification of Letters Patent.    Patented Sept. 28, 1915.

Original application filed April 30, 1914, Serial No. 835,360. Divided and this application filed January 26, 1915. Serial No. 4,475.

*To all whom it may concern:*

Be it known that we, CHARLES H. TRUE and NEAL TRIMBLE McKEE, both citizens of the United States, residing, respectively, at Hammond, Indiana, and at Dobbs Ferry, New York, have invented certain new and useful Improvements in Dies for Making Pipe-Bends, of which the following is a specification.

This application constitutes a division of our application Serial No. 835,360 filed April 30, 1914.

Our invention relates to dies for making pipe bends, and more particularly for making what are commonly known as U-shaped bends, when used in connection with boilers, superheaters and heating apparatus generally and exposed to high temperatures, or when used to carry steam or fluids under pressure.

Our invention relates particularly to dies for making bends as aforesaid when the two legs of the bend are required to be very close together.

The object of our invention is to provide dies whereby strong and durable bends of the character aforesaid can be easily and economically produced and at a small expense.

A further object of our invention is to provide dies for making bends as specified which bends shall have an internal or free cross-sectional area at all points, fully as great, if not greater, than that of the individual pipes joined by the bend.

Still a further object of our invention is to provide dies for making bends as aforesaid which, when employed as part of a superheater element of a smoke tube superheater, will not unduly restrict the flow of gases through the flue tube but will, on the other hand, facilitate the easy passage of said gases while, at the same time, exerting no greater retarding effect upon the flow of steam through the bend than would be exerted by the same length of the pipe joined by said bend.

Various ways of making bends for similar purposes have been proposed, but such ways are attended by certain disadvantages which it is the purpose of our invention to obviate.

Our invention will be better understood by referring to the accompanying drawings which show preferred devices for carrying out said invention in which—

Figure 1 represents a plan view of a pair of pipe ends in position on the lower half of the female forming die preparatory to having our improved pipe bend formed thereon; Fig. 2 is an end view of Fig. 1 with the upper half of the female forming die in position; Fig. 3 is a view similar to Fig. 1, showing the male forming die in position and the pipes and partially completed pipe bend in section; Fig. 3$^a$ is a section taken along the line 3$^a$—3$^a$ of Fig. 3, part being broken away; Fig. 4 represents a perspective view of the lower half of the female forming die; Fig. 5 represents a perspective view of the lower half of the forging die; Fig. 6 is a plan view showing the pipe bend, partially completed, lying upon the die of Fig. 5; Fig. 7 is a section along the line 7—7 of Fig. 6 except that the upper member of the forging die is shown in position; Fig. 8 is a view, similar to Fig. 6, showing the pipe bend after the forging dies of Fig. 7 have done their work; Fig. 9 is a section taken along the line 9—9 of Fig. 8; Fig. 10 is a plan view of the completed pipe bend; Fig. 11 is an edge view of Fig. 10; Fig. 12 is a section taken along the line 12—12 of Fig. 10; and Fig. 13 is a section taken along the line 13—13 of Fig. 10.

In the drawings, two pipe lengths 1, 2, which are to be united by a pipe bend, are squared off at one end, as at $a$ and clamped between two similar halves 3, 4 of a female forming die. The lower member 4 of this die is shown in Fig. 4 and comprises a block having parallel semicircular grooves 5 corresponding to the pipe diameter. The intermediate partition wall or septum between the grooves has one part 6 of the same height as the outer part of the die and another part 7 which rises gradually from a minimum height at the end of the die to a maximum height just before it joins the part 6 which it does by gentle curves which are carried around into the grooves 5. Before placing the pipe lengths in the dies 3 and 4, their ends are raised to a welding heat. The dies 3 and 4 must be securely clamped together, and it is best, also, to clamp the pipe lengths outside of the dies and to provide stops (not shown) against which the other ends of the pipe lengths may rest.

The pipe lengths being in position, as above described, a breeches die 8, comprising a pair of tapered legs 9, united by web 10 and having slightly pointed ends 11 for easy insertion, is held by the shank 12 in a suitable press (not shown) and has its legs inserted into the pipe ends at $a$ and is pushed home therein. As the web 10 reaches the inner adjacent walls 13 of the pipe ends, its comparatively sharp thin edge 13′ will slit said walls and raise and lower the slitted wall portions against the parts 7 belonging to the upper and lower die respectively and compress said slitted portions between the parts 7 and the web 10, which thickens toward its base so as to conform to the varying height of the part 7. If the dimensions of the forming dies and of the breeches die are properly chosen, the upper and lower pair of slitted pipe walls will just properly abut with welding pressure when the edge of the web 10 is distant from the end of the part 6 of the septum lying between grooves 5 by substantially the wall thickness of the pipe. A perfect weld will thereby be formed.

As will be evident from Fig. 3ª, the web 10 which unites legs 8 has substantially the same shape as that of the space comprised between the parts 7 and uniting the bores of the female forming die; but this web is smaller in section than said space and is everywhere separated from the parts 7 by an amount substantially equal to the wall thickness of the pipes. This separating distance might, however, if desired, be greater at one point and less at another within the scope of the invention, the prime requisite being that the separating space must just take and contain the slitted and spread pipe walls so as to bring their edges together with the necessary pressure to effect a satisfactory weld. The breeches die is then withdrawn, the forming die opened, and the pipe lengths with the partially completed bend removed. At this stage in the operation, the pipe bend will have the appearance shown in Figs. 6 and 7, that is to say, the two pipes will be parallel to one another, and will retain their original shape at their ends, except in the connecting region or yoke between them formed by the slitted parts of the pipe walls, which have been raised and lowered respectively and welded together as aforesaid.

It will now be necessary to suitably close the ends of the partially completed bend and at the same time to give said bend a suitable shape. These two operations may be carried out simultaneously as follows: The forging die 15, comprising similar members, is used in any suitable forging machine (not shown) after the manner shown in Fig. 7. The preferred form of the two similar members of this forging die is indicated in Fig. 5 where the one part 16 is scooped out to correspond with the conformation of the completed bend, while another part 17 is recessed by an amount substantially equal to the thickness of the pipe wall. A central recess 18 is provided at one end to receive a slip die 19 which is inserted centrally into the partially formed bend as shown in Fig. 6.

With the inchoate pipe bend in position, as shown in Figs. 6 and 7, the forging dies are lightly operated so as to effect a preliminary shaping. As soon as the central portion of the bend is flattened sufficiently to bind upon the slip die, the latter is withdrawn. The forging operation is then continued until the bend has assumed the appearance shown in Figs. 8 and 9 where, so far as its form is concerned, it is complete except for the fin 21 resulting from the flattening of the surplus wall portions lying outside of the curve which is to form the outer boundary of the completed bend. The small opening left at the end of the die by the withdrawal of the slip die should have been closed by any suitable means before the completion of the described forging operation although, if preferred, it may be closed after the remainder of the forging operation has been completed. Or, after the slip die has been removed we may remove the incomplete pipe band, as it thus exists, to a second pair of forging dies similar to those just described but having no recess 18 for the slip die. This second pair of dies will thus close the slip die opening as well as the remainder of the pipe bend opening. It now remains to remove this fin 21 and this we find can be most easily done by using an oxy-acetylene burner and running around the pipe end at the line of its junction with the fin so as to cut the fin away in any known manner. By then again running the flame around the curved end while projecting it into the plane of separation of the edges, the latter will be welded together in a firm and durable weld. Or the fin may be cut off by shearing in a suitable trimming press, or the equivalent, before proceeding to weld the edges together.

Instead of proceeding from the incomplete bend of Fig. 6 through the form of Figs. 8 and 9, i. e., instead of first compressing the ends so as to form the fin 21, and then cutting off said fin and welding the edges together, as just described, we may, if we prefer, first shear off all that portion of the incomplete bend (Fig. 6) which lies between the extreme ends and the curved line $b$. The edges at said line $b$ may then be brought together by suitable forging dies, or by other suitable means, and then welded together by the oxy-acetylene flame as before.

Other methods of bringing the edges (at the curve *b*) together or of welding them durably when brought together, may be employed within the spirit of our invention.

By suitably shaping the forming dies the end *c* of our improved pipe bend may be formed as a sharp edge from which the bend gradually widens until it has the full thickness of the pipes proper when pipes and bend merge into one another.

The bend is not quite so thick through the yoke 14 as at the sides thereof, in the particular form of bend which has been described, this lessened thickness resulting, in effect, in the production of a central groove on each side of the bend. The fire gases, as they reach the end *c* of the bend, are split and divide and pass on past the bend, the two grooves facilitating the passage of the gases and, at the same time, providing a larger heating surface for the gases to contact with. This groove is, however, not essential to the practice of our invention and may be omitted. Indeed, the form and proportions of the bend may be varied widely without departing from the spirit of the invention and the section through the bend (as shown in Fig. 13) may have any desired and convenient form.

The cross-sectional area of the passage through the pipe bend, at all points thereof, can obviously be fully as great as that of the pipe itself, and as much greater as may be desired. This is accomplished by choosing a suitable length and thickness for the web 10 and by correspondingly dimensioning the forming dies with which the web must coöperate.

When the pipe bend, made as above described, is completed (Figs. 10-12) it is practically impossible to find the welds, so perfectly and smoothly are the edges united. In particular, there will be no fins projecting inwardly from the welds; such fins occur in certain other methods of pipe bend manufacture and are very difficult if not impossible to remove. If left in place such fins will restrict the passage and produce a lack of uniformity among different bends as well as inefficiency in individual bends.

The slip die, while preferred by us, is not essential to the practice of our invention.

Changes in the exact form of the various dies, and in the details of the operations employed in shaping the bends and making the welds, may be made within the spirit of our invention as defined in the following claims.

We claim:

1. A die for making pipe bends comprising a female forming die having parallel bores for holding two pipe lengths said bores being joined by a space opening from one end of the die, and a breeches die having two legs for entering said bores, said legs being united by a web shaped to correspond with the space referred to but spaced from the walls of said space.

2. A die for making pipe bends comprising a female forming die having parallel bores for holding two pipe length said bores being joined by a space opening from one end of the die and tapering to a closure before the other end is reached, and a breeches die having two legs for entering said bores, said legs being united by a web shaped to correspond with the space referred to but separated from the walls of said space by an amount substantially equal to the thickness of the pipe walls.

3. A die for making pipe bends comprising a female forming die having parallel bores for holding two pipe lengths said bores being joined by a space opening from one end of the die and ending before the other end is reached, and a breeches die having two legs for entering said bores, said legs being united by a web shaped to correspond with the space referred to but spaced from the walls of said space.

4. A die for making pipe bends comprising a female forming die having parallel bores for holding two pipe lengths said bores being joined by a space opening from one end of the die and ending before the other end is reached, and a male die having a cutting member adapted to be pressed into the female die against the end of neighboring walls of the two pipes so as to slit and spread said walls against the opposite walls of the space joining the two bores.

In testimony whereof we have hereunto set our hands in the presence of two subscribing witnesses.

CHARLES H. TRUE.
NEAL TRIMBLE McKEE.

Witnesses as to C. H. True:
 THOMAS PHILLIPS,
 CLYDE B. LATHROP.
Witnesses as to N. T. McKee:
 JAMES K. SCOTT,
 JOHN A. BARNES.